Patented Aug. 5, 1941

2,251,449

UNITED STATES PATENT OFFICE 2,251,449

GRAVEL WASHER AND SILT GRADER

Annun Halvorson, Butte, N. Dak.

Application August 7, 1939, Serial No. 288,792

5 Claims. (Cl. 233—28)

My invention relates to gravel washers and silt graders and has for an object to provide a washer by means of which dust, sand and other relatively fine foreign material may be removed from the gravel.

Another object of the invention resides in providing a gravel washer and silt grader in which the material removed therefrom may be graded and classified according to fineness.

Another object of the invention resides in providing a gravel washer and silt grader by means of which foreign material containing metal deposits may be removed from the gravel.

Another object of the invention resides in providing a gravel washer which will be extremely efficient in operating and positive in action.

Other objects of the invention reside in the novel combination and arrangement of parts and in the details of construction hereinafter illustrated and/or described.

Figure 1:
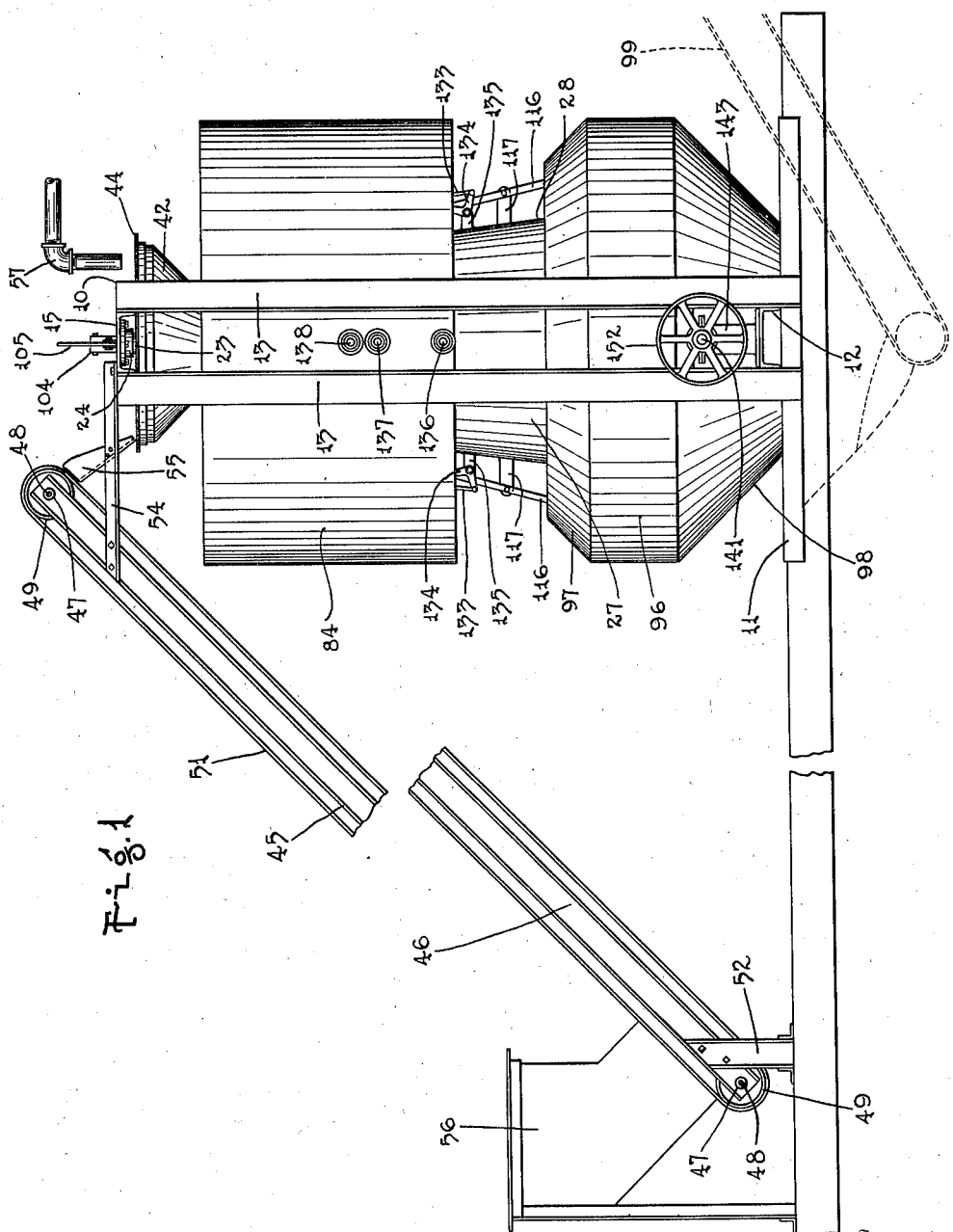
Fig. 1 is an elevational view of a gravel washer and silt grader illustrating an embodiment of my invention.

My invention comprises a framework indicated in its entirety by the reference numeral 10. This framework includes two horizontally disposed base members 11 and a cross base member 12 overlying the same. Secured to these base members are uprights 13 and 14 which are disposed at the ends of the base member 12 and near the centers of the base members 11. The various parts are bolted or otherwise secured together to form a rigid construction. At the uppermost portion of the framework 10 is provided an upper cross frame member 15 which is similarly secured to the upper ends of the uprights 13 and 14. Gusset plates 16 are attached to the uprights 13 and 14 and the cross members 12 and 15 to stiffen and reinforce the framework. The entire framework may rest upon any suitable support or be supported in any other suitable manner.

The invention utilizes a tubular shaft 17 which is provided at its lower end with a solid shaft extension 18. This shaft extension has secured to the same one of the races of a roller bearing 19. The other race of this bearing is mounted in a socket 21 formed in a bead plate 22 secured to the cross frame member 12. This bearing serves as a combination radial and end thrust bearing and supports the various mechanism operated thereby as well as the gravel to be washed in a manner to be presently described in detail. The other end of this shaft has attached to it a tubular shaft extension 23 which is rigidly secured thereto. This shaft extension is journaled in a bearing 24 which is attached to the upper cross frame member 15. The extension 23 has a bore 25 through it which communicates with the bore 26 of the shaft 17.

Encircling the shaft 17 is a drum 27 which is constructed with a tapering circumferential wall 28 and a bottom 29 connected therewith. Issuing upwardly from the tapering wall 28 is a cylindrical wall 31 which is open at the top. The bottom 29 is welded or otherwise secured to the shaft 17 whereby the lowermost portion of the drum is centered relative to the shaft and supported and driven thereby. For the purpose of supporting the uppermost portion of the drum two chains 32 are employed which are wrapped about the shaft 17 and which extend radially of the drum. The ends of these chains are attached to threaded spindles 33 which extend through the circumferential wall 28 of the drum and which have nuts 34 screwed upon the same exteriorially of the drum. When these nuts are screwed down the chains are tightened and the uppermost portion of the drum securely held in place. These chains also center the drum 27 relative to shaft 17 and maintain the drum in balance. Extending across the open upper end of the drum is a cover 35 which may be bolted to an angular flange 36, secured to the cylindrical wall 31, whereby the open end of the drum may be closed. Below the bottom 29, drum 27 is provided with a cylindrical wall 148 to the lowermost portion of which is secured a false bottom 147. By means of this construction a chamber 149 is formed in the lower part of the drum.

The cover 35 carries at the center thereof a tubular neck 37. This neck is held in position by means of a number of set screws 38 which are threaded into an upstanding flange 39 formed on said cover. By means of this construction an annular space 41 is provided between the said neck and cover, the purpose of which will be presently described. Situated above the neck 37 is a funnel 42 which has a spout 43 extending downwardly into the neck 37. The funnel 42 is attached by means of angles 44 to the cross frame member 15 of framework 10 and is of sufficient dimensions to project outwardly beyond the said cross member to permit of feeding gravel into the same. It will readily be comprehended that any substance directed into this funnel is discharged into the interior of the drum 27. For the purpose of preventing silt from entering between the spout 43 and neck 37 I employ two fingers 40 which are attached to spout 43 and depend into neck 37.

For the purpose of delivering the gravel to be washed to the machine, a conveyor 45 is employed. This conveyor consists of two longitudinal frame members 46, connected together at their ends and provided with bearings 47 adapted to journal two transverse shafts 48. These shafts have mounted upon them pulleys or sprockets 49 over which an endless belt 51 travels. The belt 51 may be provided with slats if desired, or where the conveyor is at a relatively flat angle the slats may be dispensed with. The material deposited upon the belt 51 is carried upwardly and discharged from the upper end thereof. The lower end of the frame 45 is supported on legs 52 and the upper end of the said frame is supported on brackets 54 attached to the cross frame member 15. A spout 55, at the discharge end of the conveyor, directs the gravel elevated by the same into the funnel 42. A measuring device 56, of any desired type, may be used in conjunction with the conveyor 45 to deliver to the conveyor predetermined charges of gravel to be washed in the device.

Water is fed into the interior of the drum 27 by means of a pipe 57 which may be connected to any suitable water supply system and controlled by valves or other means now available for the purpose.

Figure 2:
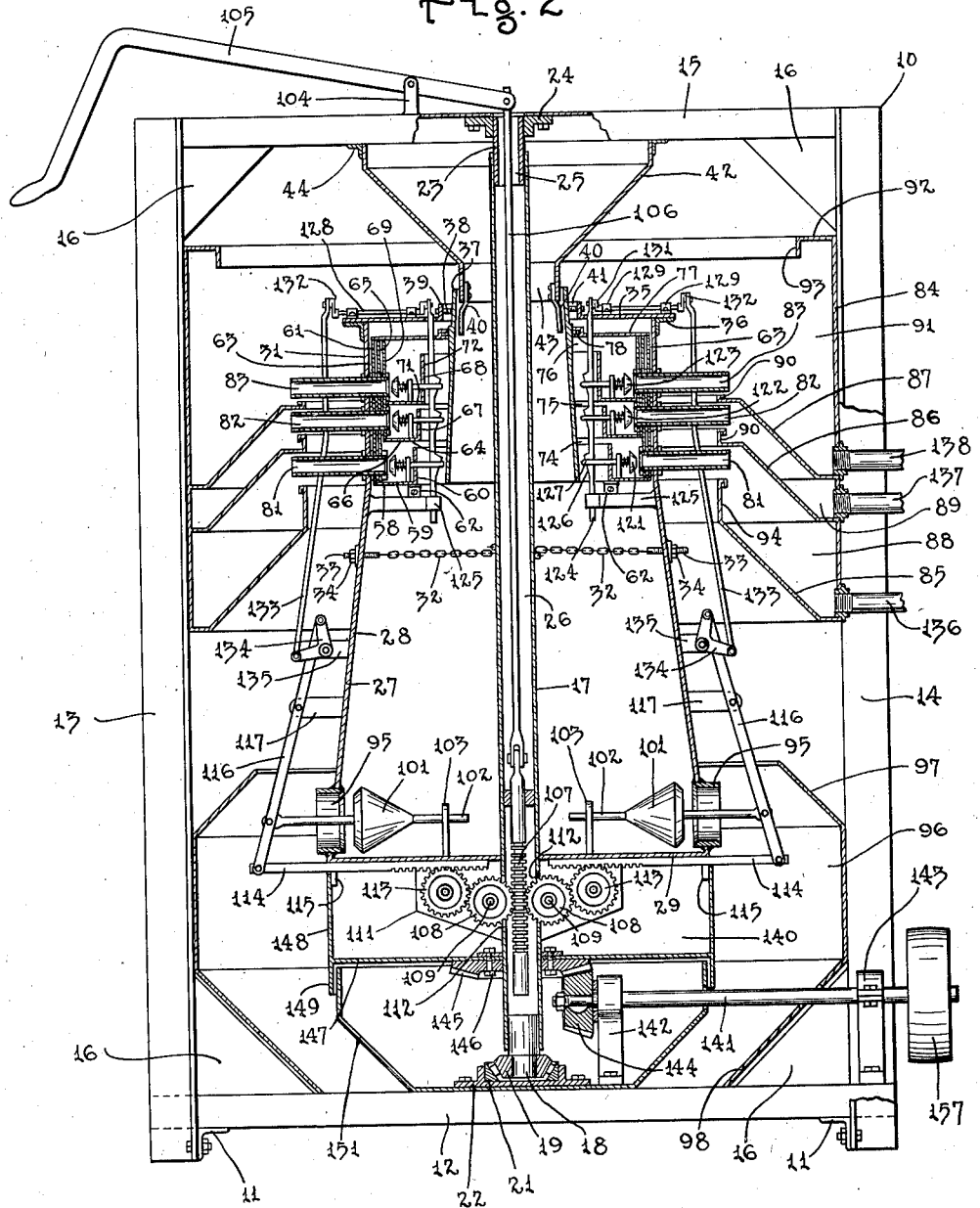
Fig. 2 is a longitudinal elevational sectional view of the structure shown in Fig. 1.

Within the interior of the cylindrical portion 31 of drum 27 is provided a receptacle 58 which has an annular radial wall 59 at the bottom of the same and a cylindrical wall 61 connected thereto. This receptacle is supported on brackets 62 attached to the interior of the drum 27. The wall 61 is of considerably smaller dimensions than the cylindrical portion 31 of drum 27 so that a space 63 is afforded between said drum receptacle. At the innermost periphery of the annular wall 59 is a flange 60 which projects upwardly therefrom. Within the receptacle 58 is another receptacle 64 constructed in a similar manner and formed with a cylindrical wall 65 and an annular radial wall 66 extending inwardly therefrom. A flange 67 projects upwardly from the innermost periphery of the annular wall 66. Annular wall 66 is attached to the cylindrical wall 65 above the lowermost edge thereof so that, when the receptacle 64 is disposed within the receptacle 58, the lowermost end of the wall 65 rests upon the wall 59 and holds the wall 66 in the position shown in Fig. 2. Within the interior of the receptacle 64 is disposed another receptacle 68 identical in construction with the receptacle 64, which latter receptacle has a cylindrical wall 69 resting upon the annular wall 66 and which further has an annular radial wall 71 and a flange 72 issuing upwardly from the inner periphery thereof. A cover 77 resting upon the upper ends of the cylindrical walls of the various receptacles and formed with a packing joint 78 encircling the neck 37 closes the various receptacles and forms a tight joint between the neck and receptacles. By means of the construction shown, a number of narrow passages 74 and 75 are provided between the various receptacles and a larger passageway 76 at the uppermost portion of the receptacle 68.

At the lowermost portion of the receptacle 58 is provided a number of discharge tubes 81 which pass directly through the walls 65 and 61 of the receptacles 58 and 68 and also through the cylindrical wall 31 of drum 27. Similarly at the lowermost portion of the receptacle 64 are provided tubes 82 which likewise pass through the various walls of the receptacles. At the lowermost portion of the receptacle 68 are similar tubes 83. All of these tubes communicate with the interiors of the receptacles and discharge outwardly of the drum 27 and are suitably packed to prevent undue leakage around the same.

Encircling the uppermost portion of the drum 27 is a cylindrical case 84 which is attached to the uprights 13 and 14 of framework 10. This case is constructed with a conical annular bottom 85 and with two spaced conical annular partitions 86 and 87 extending toward the drum 27. These partitions are arranged to provide chambers 88, 89 and 91 within said case. The partitions 86 and 87 and the bottom 85 are so arranged that the tubes 81 discharge into the chamber 88, the tubes 82 discharge into the chamber 89 and the tubes 83 discharge into the chamber 91. The upper end of the case is open and at the marginal portion of the same is provided with an inwardly extending lip 92 and a downwardly projecting flange 93 which prevents splashing of water or other material out of the case. The innermost portion of the bottom 85 is constructed with an upwardly extending flange 94 which, similar to the flange 93, prevents splashing of the material deposited in the chamber 88 out of the case 84. Similar flanges 90 on the portions 86 and 87 serve a like purpose.

For draining the chambers 88, 89 and 90 a number of drain pipes 136, 137 and 138 are employed. These drain pipes lead to suitable reservoirs to receive the material separated by the washer and may be provided with valves to control the flow of the material out of the said chambers.

In the lowermost portion of the drum 27 are provided a number of horizontally extending outlets 95. In the drawings two outlets have been shown though it can be readily comprehended that four or any other number of outlets may be employed. These outlets are adapted to discharge into a case 96 encircling the lowermost portion of drum 27. Case 96, similar to case 84, is attached to the uprights 13 and 14. The case 96 has an inwardly turned lip 97 at the uppermost portion thereof which prevents splashing of the material deposited into the same. The lowermost portion of the case 96 is constructed with a hopper 98 which directs the material discharged into the said case to a position below the base of the framework 10. At the lower end of this hopper is provided a conveyor 99 which is diagrammatically shown in Fig. 1 and which may be constructed similarly to the conveyor 45. This conveyor serves to elevate the material discharged into the hopper 98 outwardly from the machine and to any desired locality. Inasmuch as the conveyors 45 and 99 may be driven by any suitable means, such as is now well known in the art, such structures have not been illustrated in this application.

The outlets 95 in drum 27 are adapted to be closed by means of valves 101. These valves are mounted on spindles 102 guided for movement along guides 103, secured to the bottom 29 of drum 27. The valves 101 are operated in the following manner.

Pivotally secured to a bracket 104, mounted on the cross frame member 15, is a lever 105 which projects outwardly beyond the machine to a position where the same may be manipulated by the operator. This lever extends above the shaft 17 and has pivoted to its inner end a rod 106. Rod 106 extends through the bore 25 of shaft extension 23 and through the bore 26 of shaft 17 and has secured to the lowermost end thereof a circular rack 107. Rack 107 is adapted to mesh with two pinions 108, rotatably mounted on shafts 109, secured to two spaced plates 111 attached to shaft 17. The two pinions 108 project through openings 112 in the shaft 17 and are rotated as the rod 106 is reciprocated through swinging of lever 105. The two pinions 108 mesh with two gears 113 similarly mounted between the plates 111, which gears mesh with two racks 114 slidable between the plates 111 and guided for movement at their outer ends in guides 115. The racks 114, gears 113 and 108 and the plates 111 are all disposed within the chamber 140. These racks are pivoted to the ends of levers 116 which in turn are pivoted on bearings 117 attached to the outer surface of the wall 28 of drum 27. The spindles 102 of valves 101 extend outwardly through the outlets 95 and are in turn pivoted to the levers 116. It will thus be comprehended that, when the gears 113 are rotated, the said spindles are reciprocated longitudinally and the valves 101 are moved from opening to closing position and vice versa. When the material within the bottom of the hopper 27 is to be discharged the lever 105 is moved downwardly which raises the rod 106 and the circular rack 107. This rotates the gears 108 and 113 so that the racks 114 move inwardly and move the valves 101 away from the outlets 95.

The various tubes 81, 82 and 83, similar to the outlets 95 are controlled by valves 121, 122 and 123. These valves are constructed similarly to the valves 103 and are guided for movement in the same manner. For operating these valves cam bars 124 are employed which are mounted for reciprocation in guides 125, secured to the interior of the wall 28 of drum 27. These bars have cams 126 thereon which pass through the spindles 127 of the said valves and serve to move the said valves inwardly to open the passageway through the various tubes 81, 82 and 83. The said valves are closed by means of springs which are compressed by the cams 126 when the cam rod 124 is operated. The valves 121, 122 and 123 are preferably arranged in groups and a cam rod 124 used for each group, there being as many groups as there are valves 101. Inasmuch as the mechanism for operating each valve rod is identical only that used in conjunction with one rod will be described. This cam rod is operated in the following manner.

At the uppermost portion of the drum 27 is a rock shaft 128. This rock shaft is journalled in bearings 129 attached to the cover 35 of the said drum. The ends of the said rock shaft have attached to them cranks 131 and 132. Crank 132 is pivoted to the cam rod 124, while the crank 132 has pivoted to it a link 133. Link 133 is in turn pivoted to one arm of a bell crank 134 which is itself pivoted to a bracket 135 secured to the exterior of the wall 28 of drum 27. The other arm of this bell crank is pivoted to the lever 116 previously referred to. It will become apparent that, when the said lever is swung about its pivot, the linkage connected therewith operates to reciprocate the rod 124 and to open and close the various valves controlled thereby.

The drum 27 is driven by means of a shaft 141 which is journalled in two bearings 142 and 143 secured to the cross frame member 12. Shaft 141 extends through the hopper 98 and is provided at its inner end with a bevel gear 144. This bevel gear meshes with another bevel gear 145 mounted on shaft 17. The bevel gear 145 is attached by means of bolts 146 to the false bottom 147 previously referred to. The cylindrical wall 148 extends somewhat below the false bottom 147 to provide a skirt 149 adapted to overreach a housing 151 enclosing the gearing 144, 145 and the bearing 19, previously referred to. By means of this construction these parts are protected from the material passing through the gravel washer. A pulley 152, mounted on the outer end of the shaft 141, serves to transmit power to the said shaft for operating the drum 27.

The operation of my invention is as follows: Drum 27 is initially rotated and continues to rotate throughout the operation of the gravel washer. When gravel is to be washed the various valves are closed by manipulation of lever 105. While the drum is rotating water is next directed into the funnel 42 from the pipe 57, until the water flows over the top of the drum through the space 41 and into the case 84. A batch of gravel to be washed is next delivered by means of the measuring device 56 to the conveyor 46. This conveyor discharges the gravel into the spout 55 from which the same is discharged by gravity into the funnel 42 and into the interior of the drum 27. Upon the gravel reaching the interior of the drum the same is given circular motion through rotation of the drum and separation of the finer particles from the coarse particles through the action of centrifugal force is produced. As the gravel and water continue to rotate, the finer particles to be removed from the gravel rise upwardly and the gravel itself remains at the bottom of the drum 27. As rotation occurs the fine particles of material to be removed from the gravel pass through the various passageways 74, 75 and 76 and into the chambers within the various receptacles 58, 64 and 68. Any excess water within the drum 27, occasioned by the placing of the gravel into the same finds its way out of the drum along the passageway 63 and through the passageway 41 from which the same overflows the sides of the drum and escapes into the case 84. After the machine has been maintained in operation with the charge of water and the batch of gravel within the same for a relatively short length of time, the lever 105 is manually manipulated to open all of the valves. The fine material collected in the various receptacles 58, 64 and 68 is immediately discharged through the tubes 81, 82 and 83 and flows into the chambers 88, 89 and 91. From these chambers the said materials may be drained through the pipes 136, 137 and 138 to any desired locality. The gravel, upon opening of the valves 101, is discharged outwardly through the outlets 95 and into the case 96 from which the same discharges into the hopper 98 and is carried from the machine by means of the conveyor 99. After all of the water and gravel, as well as the material separated therefrom, has been discharged from the machine through centrifugal force, the various valves are again closed and the operation repeated. It will be noted that the valves are operated during rotation of the drum so that it becomes unnecessary to stop the drum.

While my improved gravel washing and silt grading machine may be used for removing undesirable foreign material from gravel, the same may also be used to extract from gravel materials foreign thereto and which bear certain metals, For this purpose I utilize the three passageways at the uppermost portion of the drum and into which the material removed from the gravel is discharged so that grading of the material so separated may be had.

I have found that my machine operates most advantageously under ordinary conditions at a speed between eighty and one hundred sixty revolutions per minute. I have also found that under ordinary circumstances complete separation of the foreign material from the gravel may be procured in about one minute to three minutes after the gravel has been discharged into the drum.

The advantages of my invention are manifest. An extremely simple and practical construction is produced by means of which the finer particles of foreign matter mixed with gravel may be separated therefrom. At the time of separation of such materials from the gravel the material so separated is also graded as to fineness. With my invention the various valves controlling the discharge of the gravel and the material separated therefrom may be simultaneously operated without stopping the operation of the drum. With my invention separation of foreign material from batches of gravel may be accomplished quickly and without loss of time. Due to the fact that the drum rotates continuously, loss of power, due to starting and stopping of the drum is greatly reduced so that a minimum amount of power is necessary to continuously operate my improved gravel washer. By the use of the several containers within the interior of the upper portion of the drum for separating the foreign material from the gravel the parts may be taken apart for cleaning and repair without great difficulty.

Changes in the specific form of my invention, as herein disclosed, may be made within the scope of what is claimed without departing from the spirit of my invention.

Having described my invention, what I claim as new and desire to protect by Letters Patent is:

1. In a gravel washer, a vertical revoluble drum having an outer wall in the form of of a figure of revolution, a neck extending downwardly into the uppermost portion of the drum and concentric therewith, means within the drum forming an annular surface concentric with the surface of the neck, said surface being disposed inwardly of the inner surface of the drum and having a plurality of openings therein disposed one above the other, said neck forming in conjunction with said means an annular constricted passageway communicating with said openings.

2. In a gravel washer, a vertical revoluble drum, a neck in the upper portion of the drum extending downwardly into the drum, means for introducing gravel and water into the neck, separating means disposed within the upper portion of said drum in the space between said drum and neck, said separating means throughout the major portion thereof being spaced from said neck to provide a vertical passageway and at the upper portion thereof extending up to said neck to close said passageway, said separating means including a number of horizontal passageways communicating with said vertical passageway and arranged at different elevations, said horizontal passageways serving to separate the various materials suspended in the water within said vertical passageway, and means for removing from said separating means the material separated thereby, said means extending through said drum.

3. In a gravel washer, a vertical revoluble drum, a neck in the upper portion of the drum extending downwardly into the drum, means for introducing gravel and water into the neck, separating means disposed within the upper portion of said drum in the space between said drum and neck, said separating means being spaced from said neck to provide a vertical passageway, said separating means having a number of horizontal passageways communicating with the vertical passageway and situated one above the other to separate the materials suspended in the water within the vertical passageway, said separating means being spaced from said drum to provide a water passageway between said separating means and drum, and means for leading the water out of said passageway through the upper portion of the drum.

4. In a gravel washer, a vertical revoluble drum, a neck in the upper portion of the drum extending downwardly into the drum, means for introducing gravel and water into the neck, separating means disposed within the upper portion of said drum in the space between said drum and neck, said separating means being spaced from said neck to provide a vertical passageway, said separating means having a number of horizontal passageways communicating with the vertical passageway and situated one above the other to separate the materials suspended in the water within the vertical passageway, said separating means being spaced from said drum to provide a water passageway between said separating means and drum, and a cover for said drum spaced from said separating means, said cover falling short of said neck to provide an outlet for leading the water passing through said last named passageway and above said separating means outwardly from said drum.

5. In a gravel washer, a vertical revoluble drum, a neck in the upper portion of the drum extending downwardly into the drum, means for introducing gravel and water into the neck, separating means disposed within the upper portion of said drum in the space between said drum and neck, said separating means throughout the major portion thereof being spaced from said neck to provide a vertical passageway, said separating means including a cover extending up to said neck and closing the uppermost portion of said vertical passageway, said separating means having a number of horizontal passageways communicating with the vertical passageway and situated one above the other to separate the materials suspended in the water within the vertical passageway, said separating means being spaced from said drum to provide a water passageway between said separating means and drum, and a cover for said drum spaced from the cover of said separating means to form a passageway therebetween, said second named cover falling short of the neck to provide an outlet for discharging water therefrom passing through said passageway between the separating means and drum and between said covers.

ANNUN HALVORSON.